United States Patent [19]

Melchior

[11] Patent Number: 5,517,954
[45] Date of Patent: May 21, 1996

[54] INDUCTION METHOD FOR A COMPRESSION-IGNITION INTERNAL COMBUSTION ENGINE

[76] Inventor: Jean F. Melchior, 126 Bld du Montparnasse, 75014 Paris, France

[21] Appl. No.: 162,200

[22] PCT Filed: May 4, 1993

[86] PCT No.: PCT/FR93/00426

§ 371 Date: Dec. 16, 1993

§ 102(e) Date: Dec. 16, 1993

[87] PCT Pub. No.: WO93/22549

PCT Pub. Date: Nov. 11, 1993

[30] Foreign Application Priority Data

May 5, 1992 [FR] France ............... 92 05515

[51] Int. Cl.⁶ ............................................. F02B 75/02
[52] U.S. Cl. ............................... 123/65 W; 123/295
[58] Field of Search ........................ 123/306, 308, 123/592, 568, 65 W, 65 WA, 65 VC, 295

[56] References Cited

U.S. PATENT DOCUMENTS

| | | | |
|---|---|---|---|
| 1,805,670 | 5/1931 | Miller | 123/65 W |
| 1,972,805 | 9/1934 | Vanni | 123/65 W |
| 2,108,576 | 2/1938 | Bokemuller | 123/65 W |
| 2,204,296 | 6/1940 | Brooks | 123/65 W |
| 2,216,083 | 9/1940 | Leser et al. | 123/65 VC |
| 2,236,950 | 4/1941 | Ricardo | 123/65 W |
| 2,265,677 | 12/1941 | Straub | 123/65 W |
| 2,962,009 | 11/1960 | Buchi | 123/65 VC |
| 4,162,663 | 7/1979 | Ehrlich | 123/65 W |
| 4,700,684 | 10/1987 | Pischinger et al. | 123/568 |
| 4,854,280 | 8/1989 | Melchior | 123/257 |
| 4,856,473 | 8/1989 | Kawai et al. | 123/308 |
| 4,993,372 | 2/1991 | Mott et al. | 123/65 BA |
| 4,995,350 | 2/1991 | Kumagai et al. | 123/90.14 |
| 5,005,539 | 4/1991 | Kawamura | 123/21 |

FOREIGN PATENT DOCUMENTS

| | | |
|---|---|---|
| 0204687 | 12/1986 | European Pat. Off. . |
| 0397521 | 11/1990 | European Pat. Off. . |
| 3149500 | 6/1983 | Germany . |
| 3401362 | 8/1984 | Germany . |
| 3828742 | 3/1989 | Germany . |
| 2223802 | 4/1990 | United Kingdom . |
| 87/04217 | 7/1987 | WIPO . |

*Primary Examiner*—David A. Okonsky
*Attorney, Agent, or Firm*—Larson and Taylor

[57] ABSTRACT

Using a centrifugation effect, the fresh air introduced to the working chamber (1) of the engine is prevented from mixing with the combustion gases intentionally retained in the latter from one cycle to the next. The means for introducing pressurised fuel (10) are arranged so as to inject the fuel directly into the central zone (G) of the chamber (1) where the concentration of the retained combustion gases and the temperature are thus made maximal, which makes it possible to reduce the ignition delay of the fuel.

21 Claims, 9 Drawing Sheets

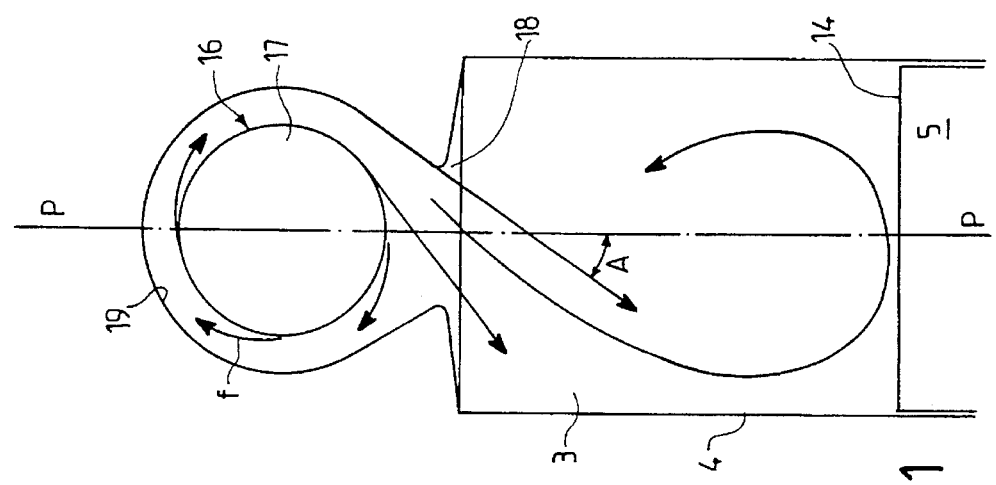
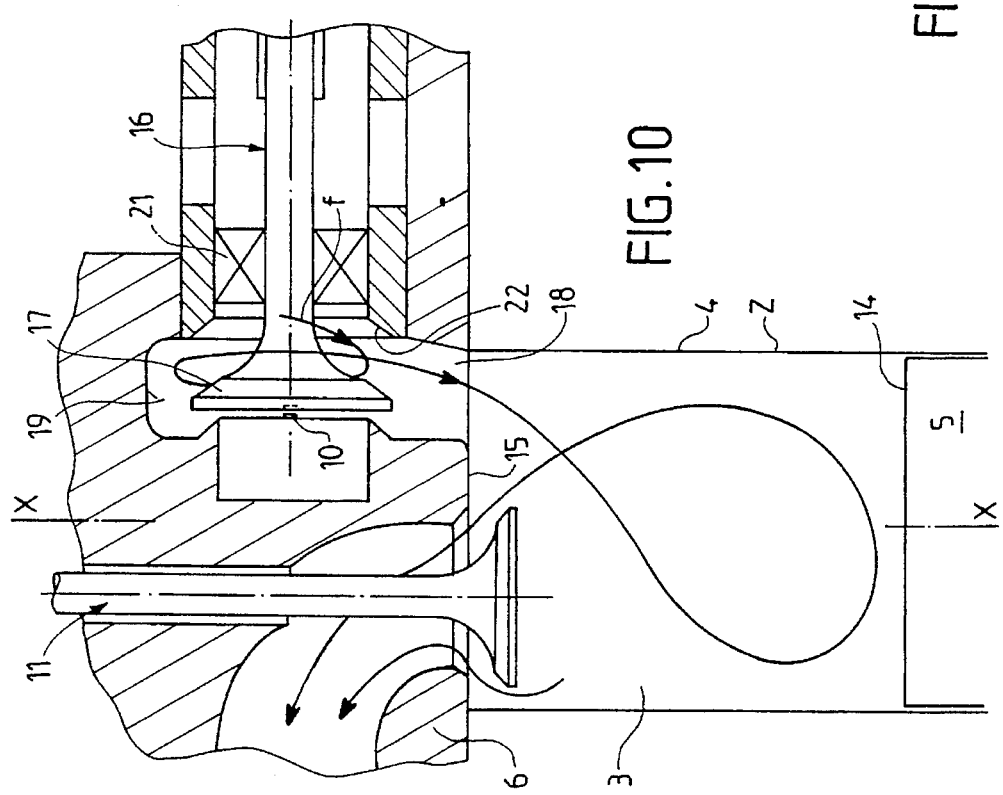
FIG. 10
FIG. 11

INDUCTION METHOD FOR A COMPRESSION-IGNITION INTERNAL COMBUSTION ENGINE

FIELD OF THE INVENTION

The subject of the invention is an induction method for a compression-ignition internal combustion engine, which comprises

- at least one working chamber made up of a combustion chamber and of the variable volume limited inside a cylinder by a piston and by a cylinder head;
- exhaust timing means and inlet timing means making it possible cyclically to make the said working chamber communicate respectively with a first cavity gathering the combustion gases formed in the working chamber and successively and/or simultaneously with a second cavity supplied with fresh air; and
- means for introducing pressurised fuel into the said combustion chamber.

In internal combustion engines of the type defined hereinabove, the fuel is injected under pressure into the combustion chamber when the piston is close to top dead centre (TDC), that is to say when the abovementioned variable volume is close to its minimum value. The adiabatic compression of the air trapped in the cylinder heats this air so that its temperature exceeds the self-ignition temperature of the injected fuel.

The finely atomised fuel is introduced into the combustion chamber in the form of droplets. By penetrating into the ambient medium, each droplet is vaporised and the fuel vapour diffuses in this medium creating a zone where spontaneous ignition conditions are reached, the ignition of the fuel then taking place here spontaneously. The time which elapses between the start of injection of the fuel and the beginning of combustion, during each cycle, is called the "ignition delay".

BACKGROUND OF THE INVENTION

This first phase of the combustion is very abrupt: the fuel vapour, premixed with hot air (under the pressure and temperature conditions required for self-ignition), ignites on mass. The reaction speed is very high and each partially vaporised droplet has very rapidly consumed all of the oxygen present in the air which is mixed with the vapour. In such a short time, since the mixture is not homogeneous, the unmixed air does not have time to sustain combustion, taking into account its distance from the centre (the droplet) of the combustion. The reaction therefore stops very rapidly, or at least slows down due to the rarefaction of the available oxygen. This mass combustion phase (uncontrolled combustion) is called the "pre-mix combustion".

The air and fuel movements which are preestablished or induced by the injection of the highly-pressurised fuel, or brought about by the expansion of the gases heated by the abrupt chemical reaction during this first phase of combustion allow the exothermic reaction to follow. The latter then develops in a controlled fashion, by virtue of the mass transfers, by diffusion, from the zones rich in fuel to the zones which are poor in fuel, that is to say towards the zones where the oxygen content is high. This phase of combustion by diffusion is called "progressive combustion". It is much slower and continues at the rate of mixing sustained by the relative movements of air and fuel in the working chamber.

Diagrams a, b, c and d of the appended FIG. 1 illustrate the phenomena which have just been described. These diagrams have, as common abscissa, the angle $\alpha$ of the crankshaft with respect to a defined angular position, the common ordinate axis Y corresponding to TDC of the piston. Diagram "a" shows the variation in pressure of the cylinder of the engine, in solid line (curve A) when there is combustion, and in broken line (curve B) when there is no combustion. Diagram "b" shows the variation in the position of the injection needle (curve C), which needle forms part of the abovementioned means for introducing pressurised fuel, and it shows up the ignition delay $\tau$ which is expressed in angular duration between the angular position of the crank shaft corresponding to the start of the introduction of fuel and that corresponding to the start of ignition, detected by the release of heat. In diagram "c", the instantaneous release of heat has been brought onto the ordinate axis, the first area D corresponding to the pre-mix combustion and the second area E corresponding to the progressive combustion. Finally, in diagram "d" the accumulative quantity of heat, in percentages of the total heat released during one cycle, has been brought onto the ordinate axis, the curve F thus obtained consequently being tangential to the 100% ordinate axis.

The longer the ignition delay, the greater the quantity of fuel injected before ignition, which leads to the following drawbacks:

- abrupt combustion, hence noises (knocking of the diesel engine) and vibrations created by the abrupt variation in pressure in the working chamber (leading to fatigue of the structures, slapping and braking of the piston rings);
- formation of highly polluting oxides of nitrogen $NO_x$ (a significant part of the $NO_x$ being formed in the zone where combustion develops as pre-mix and where high temperatures are maintained for an extended period).

The constructors of diesel engines have therefore tried to reduce the ignition delay (for example by retarding the instant at which the fuel is introduced) whilst seeking to cool the fresh air inlet into the cylinder or cylinders, so as to increase its density and so as not to exceed, as far as possible, the cycle temperatures above which the oxides of nitrogen tend to be produced in excessive quantity, which tends to increase the ignition delay. The solutions which they have proposed up until now have not given entire satisfaction, particularly from the point of view of efficiency and emissions of particulates and smoke from the exhaust.

SUMMARY OF THE INVENTION

The object of the invention is to solve, in an original fashion, the problem of shortening the ignition delay, without thereby exceeding the cycle temperatures above which the production of the oxides of nitrogen becomes too significant, not only by overcoming the drawbacks mentioned hereinabove, but also by making it possible to burn more "crude" fuels, particularly having a lower cetane number, which are therefore less expensive to produce.

To this end, the induction method which has been defined in the preamble is essentially characterised in that

- the timing means are actuated so that a significant part of the combustion gases from the previous cycle is retained in the working chamber during the process consisting in evacuating the combustion gases and replacing them in part with fresh air, by opening the exhaust and inlet timing means, this process being that of pumping-across in the case of a four-stroke engine, and that of scavenging in the case of a two-stroke engine, the communication between the second cavity and the working chamber, when the inlet timing means are in the open position, on the one hand, and the shape of the walls of the working chamber, on the other hand, are arranged so that the flow of fresh air penetrates into the combustion chamber, while the volume of the working chamber becomes minimal due to the relative movement of the piston, so as to bring about an intense rotational movement of the working fluid inside the combustion chamber, thereby preventing, as far as possible, and by virtue of the centrifugation of the fresh air obtained by this rotational movement and of the difference in density between the fresh air and the combustion gases, the fresh air from mixing, inside the combustion chamber, with the combustion gases retained in the latter, and to form, in the said combustion chamber, a central zone where the concentration of the combustion gases and the temperature are maximal, and a peripheral zone where the concentration of fresh air is maximal and the temperature is minimal, and the abovementioned means for introducing pressurised fuel are arranged so as to inject the fuel directly into the abovementioned central zone, at least at the beginning of each injection period.

Preferably, the mass of combustion gases retained in the working chamber, from one cycle to the next, is at least equal to 10%, preferably 15%, of the mass of the working fluid contained in this latter chamber at the moment at which the communications between the latter and each of the abovementioned cavities has just been interrupted during each cycle, while the engine is operating, at least approximately at its nominal speed.

In this way, and as will be explained in more detail with the aid of FIGS. 2 to 5, a combustion is organised whose ignition delay is extremely short (even with the use of less refined fuels, called "crude" fuels), or even zero, by considerably increasing the temperature of the medium into which the fuel is injected so as to bring about its almost immediate vaporisation. Nevertheless, the mean temperature of the working fluid is kept at reasonable levels, which allows a high density, and consequently high specific power and low rate of production of oxides of nitrogen. In addition, the overheated gaseous medium is kept away from the walls of the combustion chamber by the presence of an intermediate layer of fresh air, which prevents thermally overloading the engine and limits the losses at the walls.

It should be noted that the invention goes against the generally admitted ideas in the construction of diesel engines where specialists try to promote maximum pureness of fresh air of the working fluid, rather than promoting a relatively low pureness (90%, perhaps 85%, or even less by mass) and injecting the fuel into a zone where the concentration of combustion gases retained from one cycle to another is maximum, it being recalled that, in a compression-ignition engine, the combustion gases still contain a notable proportion of available oxygen.

According to a particularly surprising improvement, the temperature of the inlet air and the proportion of the gases retained in the working chamber, from one cycle to the next, taking account of the other operating parameters of the engine, is chosen so that if the retained gases and the fresh air were mixed before injecting the fuel, the temperature of the mixture thus obtained at the moment of injection could be less than that at which self-ignition of the fuel takes place in a stable fashion without producing excessive end gases.

This improvement has the advantage of making it possible both to cool the fresh induction air intensely (so as to limit the thermal load on the walls and reduce the maximum temperatures of the cycle to values lower than those which bring about an excessive formation of noxious oxides of nitrogen) and to have a reduced effective volumetric ratio (so as to limit the mechanical load of the components), whilst retaining perfect self-ignition conditions with a reduced ignition delay.

It is also advantageous to choose the temperature of the inlet air and the proportion of the gases retained in the working chamber, from one cycle to the next, taking account of the other operating parameters of the engine, so that the maximum mean temperature of the working fluid does not exceed the value, of the order of 1500° C., beyond which the production of $NO_x$ becomes excessive.

The invention preferably applies to engines operating on a two-stroke cycle.

Preferably, the abovementioned timing means are actuated so that the volume of fresh air introduced into the working chamber is less than the volume of the working chamber at the instant where the exhaust and inlet timing means have just returned to the closed position during a cycle.

According to an advantageous construction, the inlet timing means are essentially made up of ports communicating with the abovementioned second cavity, made in the part of the lateral wall of the cylinder which is swept by the piston and are uncovered by the latter when the volume of the working chamber is close to its maximum value, the said ports being inclined with respect to a normal to the said lateral wall, located near these ports, so as to create the abovementioned rotational movement; furthermore, the exhaust timing means are made up of at least one exhaust valve made in the abovementioned cylinder head and arranged so that it leaves free the central region of the latter making it possible to arrange, in this region, the means for introducing the pressurised fuel. In this case, the combustion chamber is preferably made up of the space which is delimited by the cylinder head, the abovementioned lateral wall and the piston when the latter is close to the position corresponding to the minimum value of the volume of the working chamber. The transverse surface of the piston contributing to delimiting the combustion chamber, which is preferably an axisymmetric surface, and the minimum value of the distance between the piston and the cylinder head are preferably such that the radial movements of the working fluid created by the interaction between the abovementioned surface of the piston and the cylinder head are as small as possible. In this way, mixing between the fresh air and the recycled combustion gases is reduced as much as possible.

BRIEF DESCRIPTION OF THE DRAWINGS

The invention will be explained in more detail with the aid of the appended figures.

FIGS. 10 and 11 represent diagrammatically a two-stroke engine according to a second embodiment, in axial sections respectively through the plane of symmetry P of FIG. 11, and through a plane perpendicular to this plane of symmetry, the piston of this engine occupying a position close to BDC.

DESCRIPTION OF THE PREFERRED EMBODIMENTS

Before describing in detail the induction method in accordance with the invention, it seems useful to distinguish its objects and results from those of the state of the art, with the aid of the diagrams of FIGS. 2 to 5.

Figure 2:
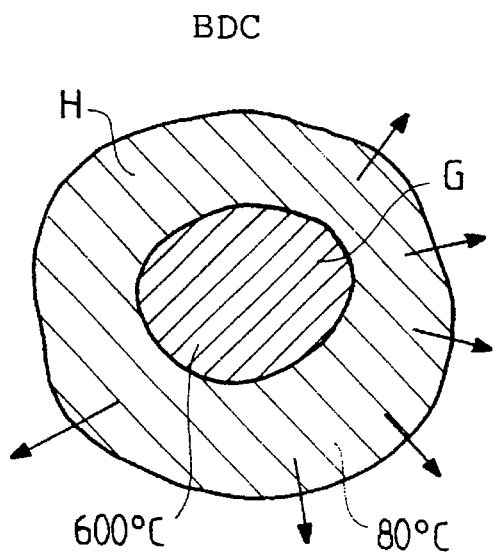
FIGS. 2 and 3 show diagrammatically the distribution of temperatures and volumes in the working chamber, respectively before compression (at BDC) and at the moment of the start of injection of fuel (at TDC), according to a specific embodiment of the induction method in accordance with the invention.
Figure 3:
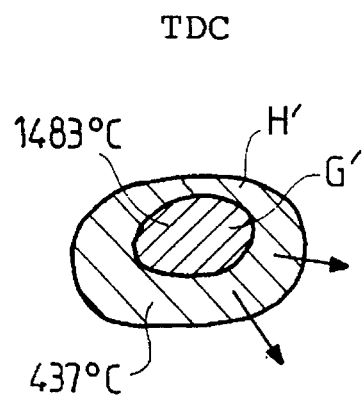
Figure 4:
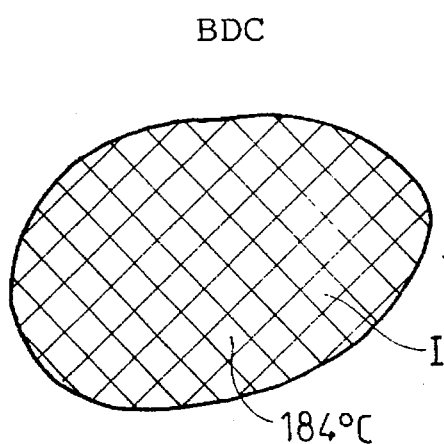
FIGS. 4 and 5 are figures respectively similar to FIGS. 2 and 3, but according to an induction method close to conventional methods.

These diagrams illustrate, by variations of the surface area, the variations in volume of the working chamber. According to the method in accordance with the invention, it is contrived for there to be formed, in the working chamber close to bottom dead centre, a central zone (G) in which the concentration of combustion gases, coming from the previous cycle, is maximum and a peripheral zone (H) where the concentration of fresh air is maximal (FIG. 2). Assuming that the engine is supercharged, the temperature of the fresh air (in H) can be estimated as being approximately 80° C., and the temperature of the combustion gases (in G) can be estimated as being approximately 600° C. Close to top dead centre, that is to say after compression and at the moment at which the injection takes place, there remains a central zone G' and a peripheral zone H' of smaller volumes and higher temperatures (FIG. 3). With the compression ratios of current engines of the order of 6 and a proportion of 20% (by mass) of combustion gas retained from one cycle to the next, the temperature of the central zone G' is now of the order of 1483° C. whereas the temperature of the peripheral zone H' is of the order of 437° C. According to the invention, injection takes place in the central zone G' whose temperature is very high whereas the temperature of the peripheral zone H' remains moderate, which takes significant thermal overloads away from the walls of the cylinder.

Figure 5:
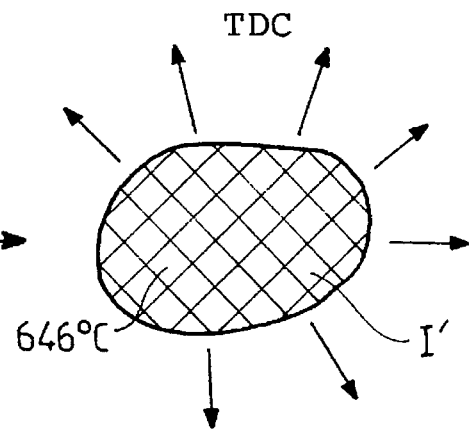

Making the same assumption but by mixing the retained combustion gases with the fresh air and according to conventional induction methods (assuming that the arrangements, belonging to the invention, for retaining combustion gases from one cycle to the next have been made) volumes are obtained of having relatively homogeneous compositions and temperatures I at bottom dead centre (FIG. 4) and I' at top dead centre (FIG. 5), the temperature of the working fluid passing from approximately 184° C. (FIG. 4) to approximately 646° C. (FIG. 5). It can be seen, on the one hand, that injection takes place (FIG. 5) in a fluid whose temperature (approximately 646° C.) is much lower than according to the method in accordance with the invention (approximately 1483° C., FIG. 3) and that, on the other hand, the peripheral temperature is distinctly higher (approximately 646° C. in FIG. 5 instead of approximately 437° C. in FIG. 3), the consequences of these differences in temperature having been explained hereinabove.

It is even possible, according to the invention, to choose the proportion of the gases retained in the working chamber from one cycle to the next, so that if the retained gases and the fresh air were mixed before injecting the fuel, the temperature of the mixture thus obtained would be lower than that at which self-ignition of the fuel takes place in a stable fashion and without the excessive production of end gases. A numerical example of this improvement (not illustrated in the drawings) is given hereafter:

- temperature of the fresh air introduced into the working chamber: 50° C.;
- temperature of the combustion gases: 600° C.;
- proportion, by mass, of fresh air contained in the working fluid at the beginning of compression: 90%;
- effective volumetric ratio: 5;
- temperature of the gaseous fluid after compression, if the fresh air and the retained combustion gases were mixed before injecting the fuel: 436° C.;
- temperature of the air in the peripheral zone H' according to the invention, after compression: 342° C.;
- temperature of the gases in the central zone G' according to the invention, after compression: 1389° C.

With the aid of this second example, it can be seen that it is possible, by virtue of the stratification of the gases in accordance with the invention, and without modifying the other operating parameters of the engine, to make the temperature of the gaseous medium into which the fuel is injected pass from a low value (436° C.) for which white exhaust smoke is produced and self ignition is problematical, to a high value (1389° C.) for which these drawbacks disappear.

The invention will now be described with reference to FIGS. 6 and 7 which represent diagrammatically a two-stroke engine. This engine comprises:

- at least one working chamber 1 made up of a combustion chamber 2 and of the variable volume 3 limited inside a cylinder 4 by a piston 5 and by a cylinder head 6;
- exhaust timing means and inlet timing means making it possible cyclically to make the working chamber 1 communicate with a first cavity 8 gathering the combustion gases formed in the working chamber 1 and successively and/or simultaneously with a second cavity 9 supplied with fresh air; in general, the first cavity 8 is made up of an exhaust manifold and the second cavity 9 by an inlet housing, supplied with fresh air by a supercharging turbo compressor (not shown); and
- means 10 serving to introduce pressurised fuel into the combustion chamber 2.

Figure 1A:
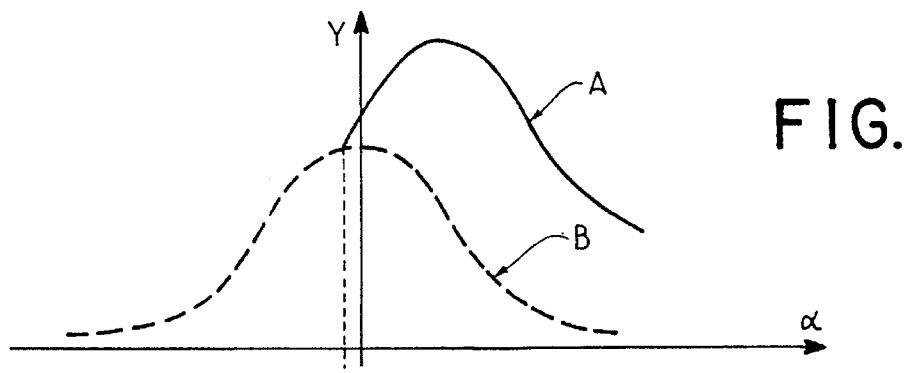
FIG. 1 shows diagrams which have been commented on hereinabove.
Figure 1B:
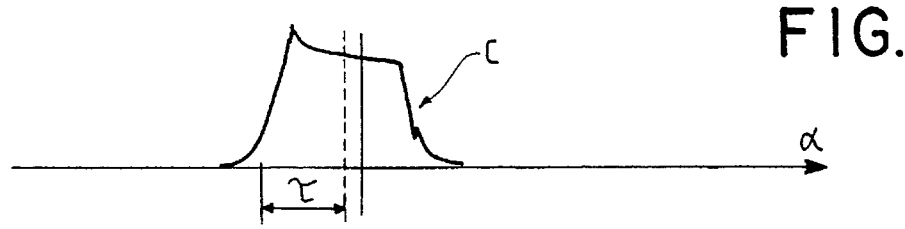
Figure 1C:
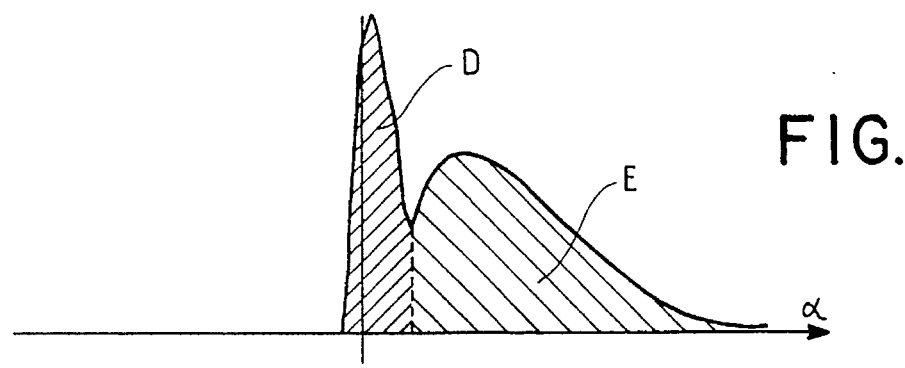
Figure 1D:
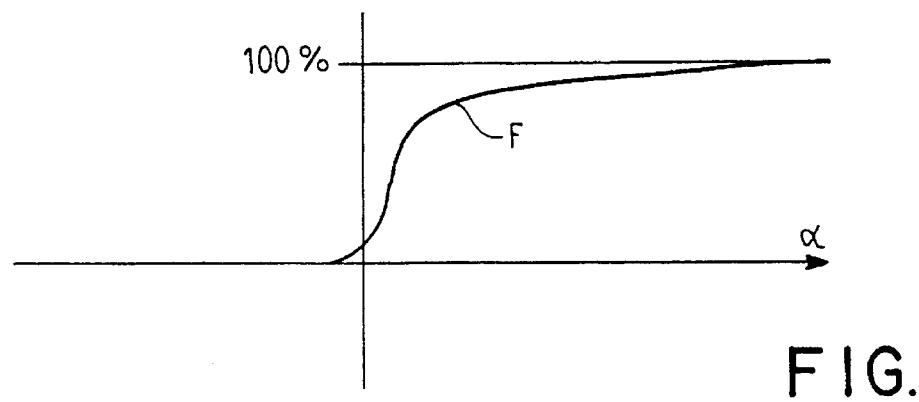
Figure 6:
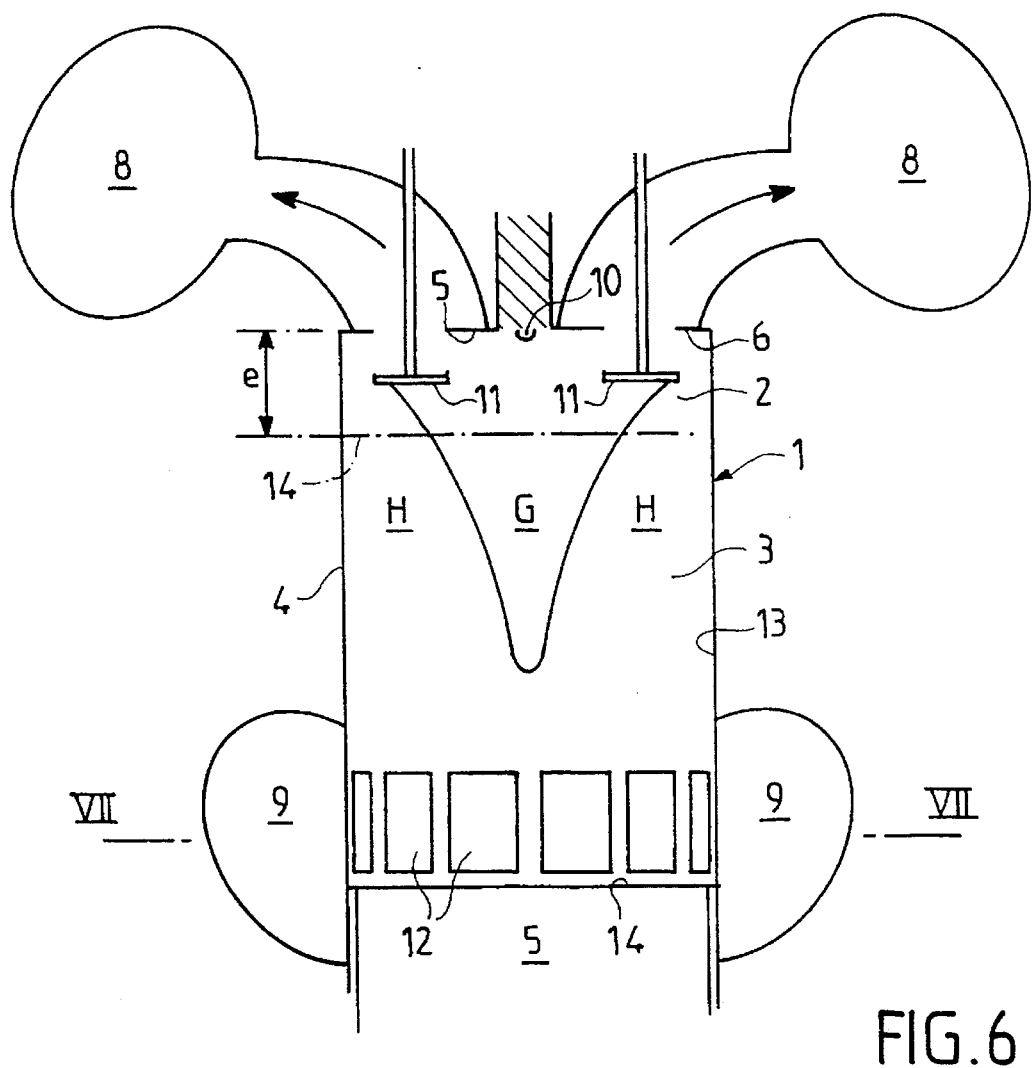
FIGS. 6 and 7 represent diagrammatically, respectively in axial section and in transverse section along the line VII—VII of FIG. 6, a two-stroke engine which serves to implement the method in accordance with the invention and whose piston occupies a position close to BDC.
Figure 7:
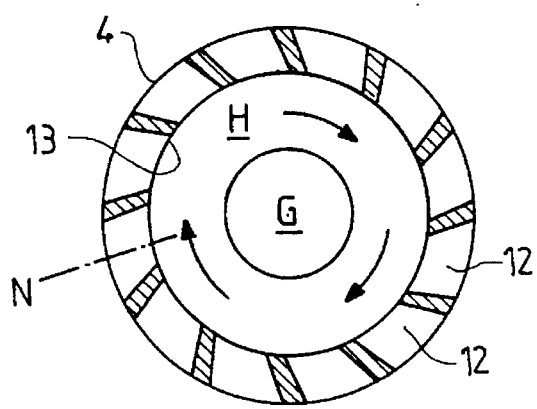

According to the embodiment represented in FIGS. 6 and 7, the exhaust timing means are essentially made up of at least one exhaust valve 11 made in the cylinder head 6 and the inlet timing means are essentially made up of ports 12 made in the part of the lateral wall 13 of the cylinder 4 which is swept by the piston 5 and are uncovered cyclically by the latter when the volume of the working chamber 1 is close to its maximum value.

According to the invention, the timing means 11 and 5, 12 are actuated so that a significant part of the combustion gases from the previous cycle is retained in the working chamber 1 during the process consisting in evacuating the combustion gases and replacing them, in part, with fresh air, by simultaneously opening the timing means 11 and 5, 12, that is to say during scavenging because here it involves a two-stroke engine.

Furthermore, the communication between the second cavity 9 and the working chamber 1, when the inlet timing means 5, 12 are in the open position, on the one hand, and the shape of the walls of the working chamber 1, on the other hand, are arranged so that the flow of fresh air penetrates into the combustion chamber 2, while the volume of the working chamber 1 becomes minimal due to the relative movement of the piston 5, so as to bring about an intense rotational movement of the working fluid inside the combustion chamber 2, thereby preventing, as far as possible, and by virtue of the centrifugation of the fresh air obtained by this rotational movement and of the difference in density between the fresh air and the combustion gases, the fresh air from mixing, inside the combustion chamber 2, with the combustion gases retained in the latter, and from forming, in the said combustion chamber, the abovementioned central zone G where the concentration of the combustion gases is maximal, and the abovementioned peripheral zone H where the concentration of fresh air is maximal.

Finally, the abovementioned means for introducing fuel 10 are arranged so as to inject the fuel directly into the central zone G, at least at the beginning of each injection period.

It has been said hereinabove that a significant part of the combustion gases from the previous cycle is retained in the working chamber 1 during scavenging. This signifies that the mass of combustion gases thus retained is advantageously equal to at least 10%, preferably to at least 15% and, in particular to 20%, of the mass of the working fluid contained in this chamber 1 at the moment at which the communications between the latter and each of the cavities 8 and 9 have just been interrupted during each cycle. This percentage limit, is, of course, only valid when the engine operates at least approximately at its nominal speed and particularly outside of the start-up periods.

According to the embodiment shown, each of the ports 12 is inclined with respect to a normal N (FIG. 7) to the lateral wall 13, located close to the port 12 in question, so as to create the abovementioned rotational movement, shown diagrammatically by arrows in FIG. 7. More precisely, each port is approximately symmetrical with respect to a plane perpendicular to the axis of the cylinder 4, (such as the section plane VII—VII of FIG. 6) and the normal N is parallel to this plane or located in it. In addition, the exhaust valve 11 (two in number according to the example shown in FIG. 6) is arranged so that it leaves free the central region of the cylinder head 6 making it possible to locate in this region the means for introducing fuel 10.

In this case, the combustion chamber 2 is made up of the space which is delimited by the cylinder head 6, the lateral wall 13 of the cylinder 4 and the piston 5 when the latter is close to the position corresponding to the minimum value of the volume of the working chamber 1. In FIG. 6, the transverse surface 14 of the piston 5 which contributes to delimiting the combustion chamber 2 when the piston 5 occupies the position which has just been defined has been represented in chain line, and the piston 5 at its BDC has been represented in solid line.

Preferably, the combustion chamber 2 has an axisymmetric shape and the minimum value "e" of the distance between the piston 5 and the cylinder head 6 during the displacement of the piston is such that the radial movements of the working fluid created by the interaction between the transverse surface 14 of the piston 5 and the cylinder head 6 are as small as possible. To this end, the surface 14 and the underside 15 of the cylinder head 6 are as parallel as possible and may, in particular, both be planar.

Figure 8:
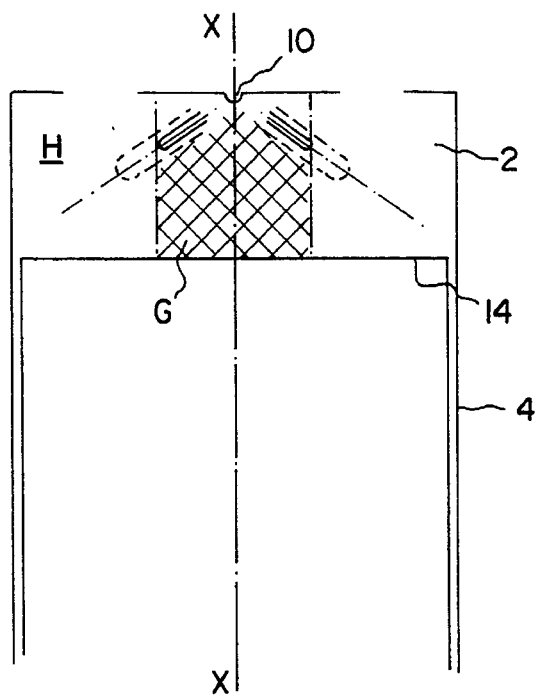
FIG. 8 represents the engine of FIGS. 6 and 7, whose piston occupies a position close to TDC, for which injection and ignition of the fuel takes place.
Figure 9A:
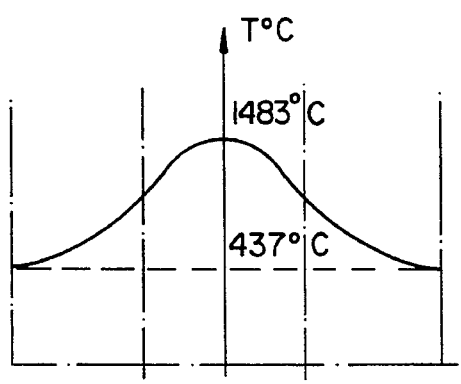
FIG. 9 illustrates the distribution of temperatures, of fresh air and of oxygen under the conditions of FIG. 8.
Figure 9B:
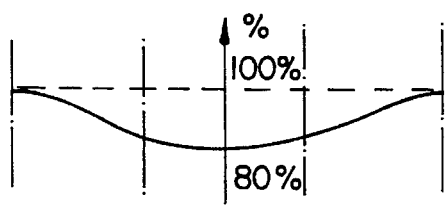
Figure 9C:
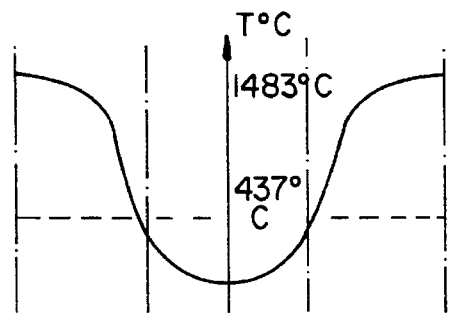

FIG. 8 represents the engine of FIGS. 6 and 7 at the moment of injection and ignition of the fuel whereas FIG. 9 represents at "a" the variations in the local temperature of the working fluid, at "b" the variations in the concentration of air (% by mass) of the working fluid, as a function of the distance to the axis X—X of the cylinder 4, measured on the same scale as in FIG. 8, and at "c" the free oxygen concentration of the working fluid on the same abscissa as the curve "b". In FIGS. 9a and 9b the numerical values of the example described hereinabove with respect to FIG. 3 can again be found.

Reference will now be made to the embodiment of FIGS. 10 to 12, according to which the exhaust timing means and the inlet timing means are both made up of exhaust valves 11 and inlet valves 16 made in the cylinder head 6.

In this case, the combustion chamber 2 is made up of the recess 19, preferably an axisymmetric one, made in the cylinder head 6 and in which the head 17 of the inlet valve 16 is located. This recess communicates with the volume 3 which is swept by the piston 5 via a passage 18 whose walls are arranged so as to direct the flow of fresh air towards the piston 5 when the exhaust valves 11 and inlet valves 16 are opened simultaneously and the piston 5 is located in positions corresponding to values of the volume 3 close to the maximum value (FIGS. 10 and 11). The introduction means 10 are located in the recess 19.

The exhaust valve 11 is preferably located on the cylinder head underside 15. The recess 19 and the volume 3 communicate with each other via the passage 18 whose walls are arranged so as to direct the flow of fresh air introduced into the volume 3 when the exhaust valves 11 and inlet valves 16 are open simultaneously and the piston 5 is located close to the position (represented in FIGS. 10 and 11), corresponding to the maximum volume of the working chamber 1, towards the piston 5 and tangentially to the part of the lateral wall 13 of the cylinder 4 which is furthest away from the exhaust valve 11. Any risk of fresh air passing directly to the exhaust is thus reduced.

Again preferably the walls of the passage 18 are orientated such that the flow of fresh air directed towards the piston 5 has a direction which is inclined by an angle A (FIG. 11) with respect to the axis of displacement of the piston 5 and in a plane tangential to the lateral wall of the cylinder, passing preferably close to the generatrix Z (FIG. 10) furthest away from the exhaust valve, so as to induce a helicoid movement of the said air flow in the volume lying between the piston 5 and the cylinder head 6 (see the arrows symbolising the circulation of the fresh air in FIGS. 10 and 11).

Figure 12:
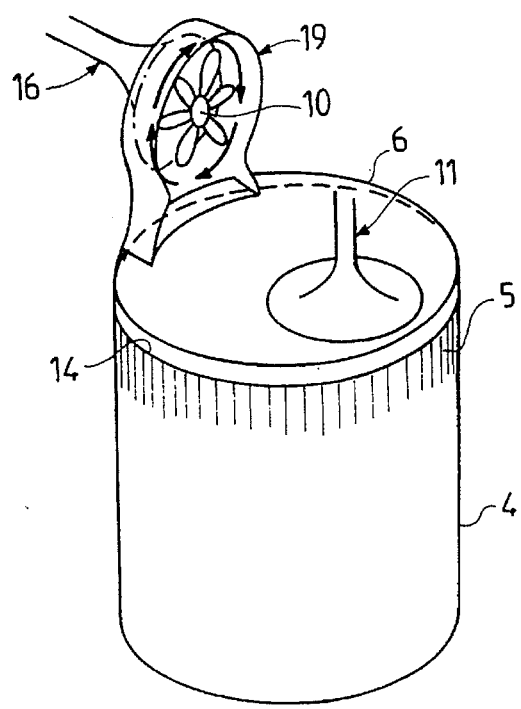
FIG. 12 is a view in perspective of the engine of FIGS. 10 and 11, the piston of this engine occupying a position close to TDC.

Again preferably, the shape of the passage 18 is such that when the piston 5 rises, the working fluid is injected into the combustion chamber mainly tangentially to a peripheral wall of the passage 18, so as to create a rotational movement in the said recess about its axis of revolution, as shown diagrammatically by arrows in FIG. 12.

It is judicious to make the introduction means 10 open out into the combustion chamber 2 or into the recess 19 facing the inlet valve 16, in the central zone of the recess 19, as shown diagrammatically in FIG. 12.

Finally, means are provided for subjecting the air to a turning movement, shown diagrammatically by arrows f in FIGS. 10 and 11, when it opens out into the recess 19. Such means have been described in the French Patent Application No. 90 06781 of 31 May 1990 (FR-A-2,662,745) and may for example be made up of helicoid blading 21 located directly upstream of the seat 22 of the inlet valve 16.

Figure 16:
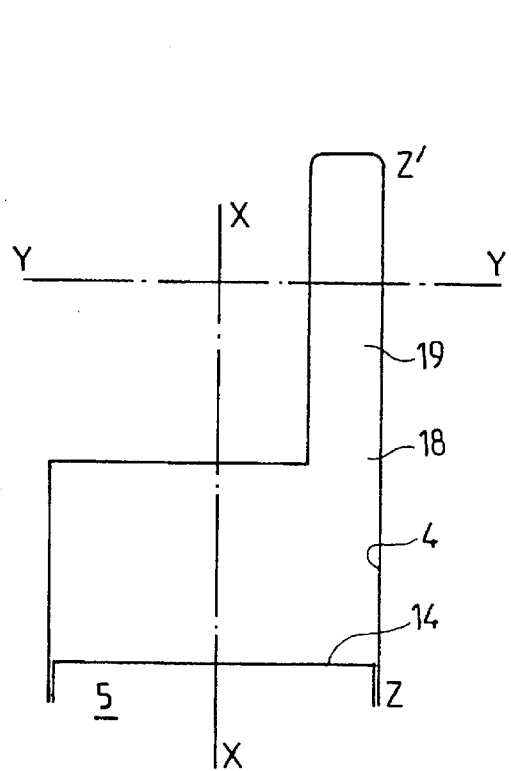
FIGS. 16 to 18 illustrate diagrammatically a first variant for subjecting the inlet air to a turning movement, respectively via views in elevation along two mutually perpendicular directions, and via a plan view.
Figure 17:
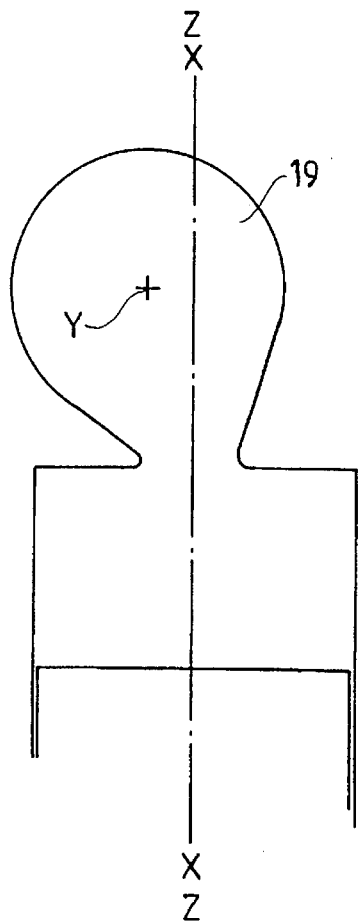
Figure 18:
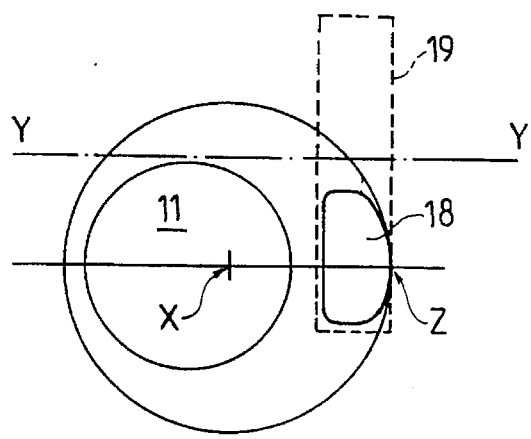
Figure 19:
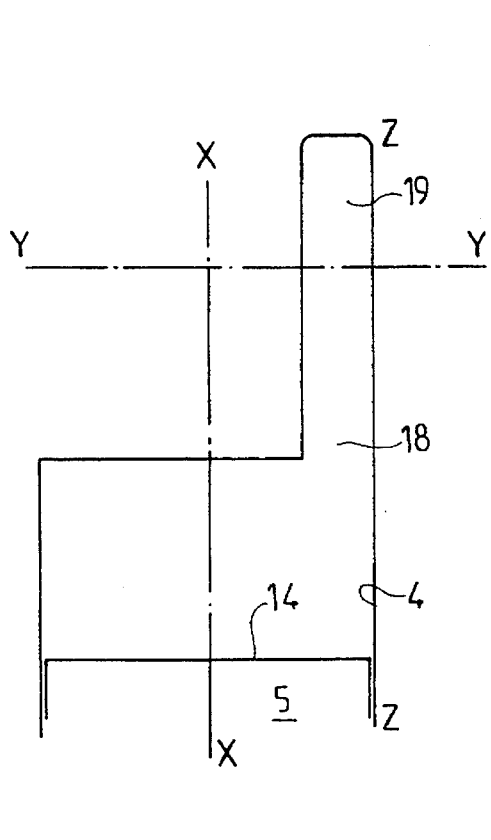
FIGS. 19 to 21, on the one hand, and FIGS. 22 to 24, on the other hand, illustrate diagrammatically a second and a third embodiment for subjecting the inlet air to a turning movement, respectively using views similar to those of FIGS. 16 to 18.
Figure 20:
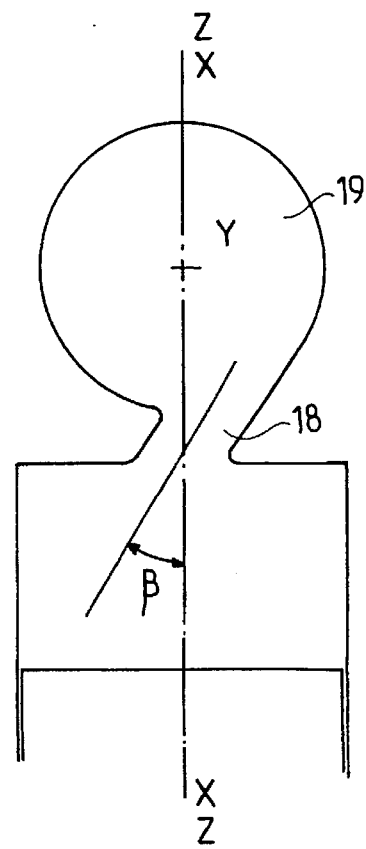
Figure 21:
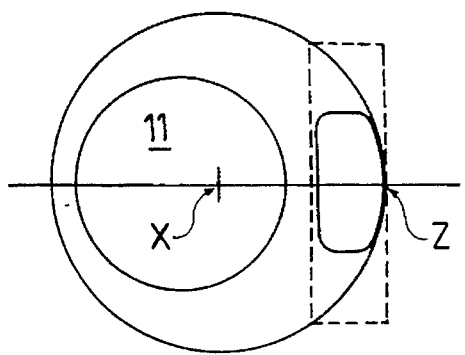
Figure 22:
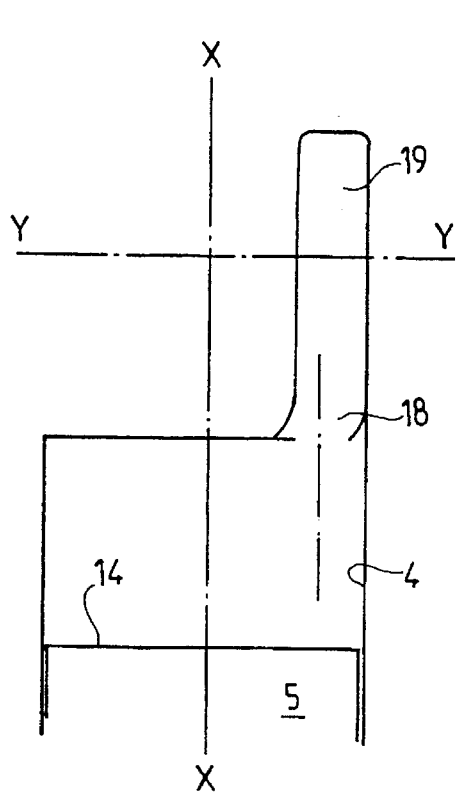
Figure 23:
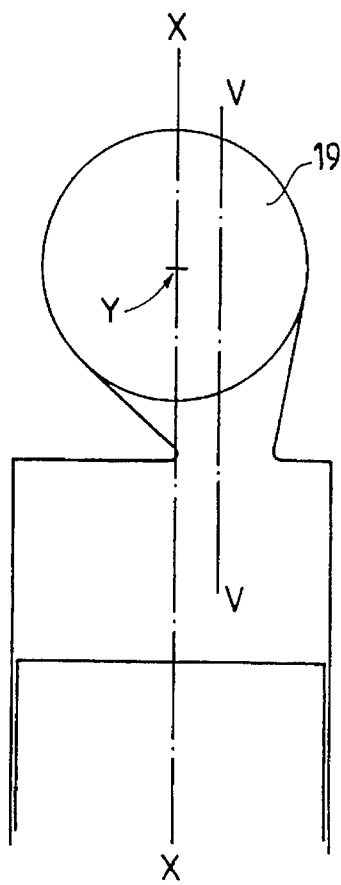
Figure 24:
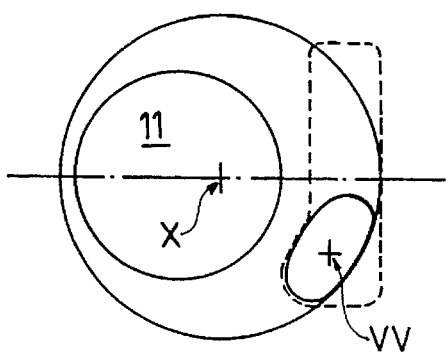

In order to subject the air to a turning movement, recourse may further be made to one of the following solutions:

a) as represented in FIGS. 16 to 18, the recess 19, which is axisymmetric, has its axis Y—Y which is located approximately in a plane perpendicular to the axis X—X of the cylinder 4 and does not pass through this axis X—X, the transfer passageway 18 preferably opening out tangentially to the wall of the cylinder 4 close to the generatrix Z of the latter which is furthest away from the exhaust valve 11;

b) as represented in FIGS. 19 to 21, the recess 19 is axisymmetrical about an axis Y—Y which is perpendicular to the axis X—X of the cylinder 4 and preferably secant to the latter (or passing through its immediate vicinity); the transfer passageway 18 opens out tangentially to the wall of the cylinder 4, close to the generatrix Z of this cylinder which is furthest away from the exhaust valve 11; and the lateral walls of the transfer passageway 18 are substantially parallel to each other and inclined by an angle β with respect to the axis X—X of the cylinder 4 in the plane which is tangential to the said cylinder 4 preferably passing through the generatrix Z furthest away from the exhaust valve 11;

c) as represented in FIGS. 22 to 24, the recess 19 is axisymmetric, of axis Y—Y located in plane perpendicular to the axis X—X of the cylinder 4 and preferably secant to the latter (or passing through its immediate vicinity); the transfer passageway 18 opens out tangentially to the wall of the cylinder 4; the axis V—V parallel to the axis X—X of the cylinder 4 and passing through the centre of the opening of the transfer passageway 18 is not secant to the axis of revolution Y—Y of the recess 19.

In the preceding text, it was assumed that the method in accordance with the invention was implemented in a two-stroke engine, but it may equally well be used in a four-stroke engine, in which engine the exhaust timing means generally comprise at least one exhaust valve 11 and the inlet timing means at least one inlet valve 16.

For a four-stroke engine, the retention of the combustion gases is obtained by adjusting the timing so as to prevent the complete discharge of the gases out of the cylinder or even to cause them to be sucked back in, before initiating the process where fresh air is inlet during the falling stroke of the piston.

Figure 13:
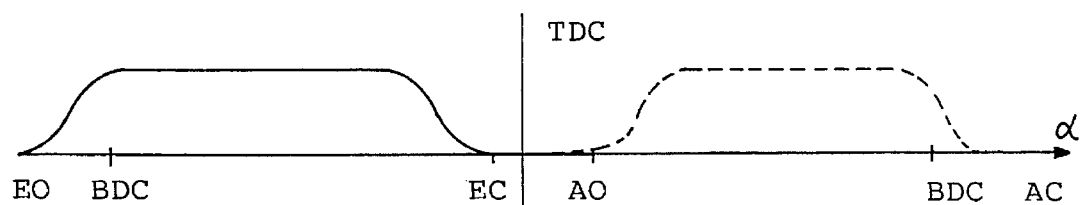
FIGS. 13 to 15 are exhaust and inlet valve-opening diagrams in a four-stroke engine serving to implement the method in accordance with the invention.
Figure 14:
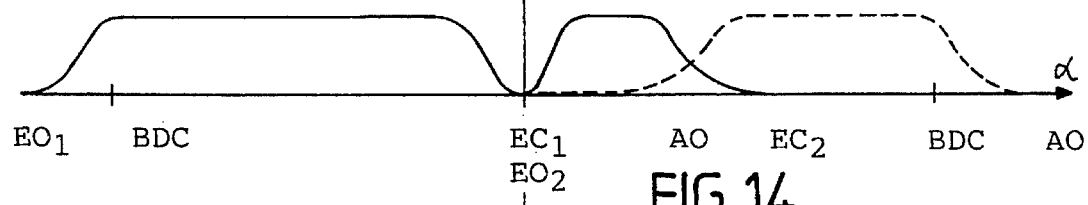
Figure 15:
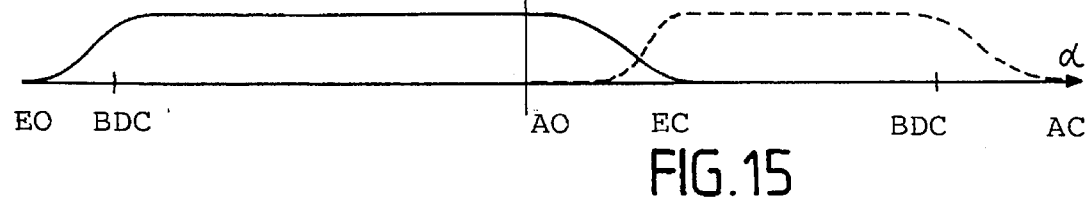

In this case, it is sufficient to describe the exhaust and inlet valve opening diagram so as to put the person skilled in the art in a position to adapt known four-stroke engines to the method in accordance with the invention, with the aid of FIGS. 13 to 15 which represent, as a function of the angle α of the crank shaft or main shaft of the engine, the opening lifts of the exhaust valve (in solid line) and the inlet valve (in broken line) respectively.

According to the diagram of FIG. 13, there is premature closing of the exhaust and delayed opening of the inlet. The exhaust timing means are closed (EC=exhaust closed) before the volume of the working chamber 1 is minimum and the inlet timing means open (AO=admission open) only during the stroke of the piston 5 corresponding to the increase in the abovementioned volume, at the moment where the main shaft of the engine has a position which, with respect to the position corresponding to the minimum value of this volume, is substantially symmetrical with that corresponding to the closure of the exhaust timing means. "EO" denotes opening of the exhaust and "AC" indicates the closure of the inlet.

According to the diagram of FIG. 14, the exhaust timing means are closed (at $EC_1$) when the volume of the working chamber 1 is close to its minimum value, when there is a risk of producing interference between the piston 5 and the exhaust timing means, then reopened when this volume reaches then exceeds its minimum value, then closed again (at $EC_2$) whilst the inlet timing means start to open and the piston is in its stroke for increasing the said volume. For this purpose a twin-lobed exhaust camshaft is used so as to suck back part of the discharged gases.

The diagram of FIG. 15 is a variant of that of FIG. 14 which corresponds to the case where there is no risk of interference being produced between the piston 5 and the exhaust timing means. This is the case, for example, when the exhaust control takes place via a cock, replacing a valve, or when it takes place via a valve located in a valve cage or in a chamber which is separate from the main chamber. It is therefore not necessary temporarily to reclose the exhaust timing means, as can be seen by comparing the diagrams of FIGS. 14 and 15.

I claim:

1. An induction method for a compression-ignition internal combustion engine including at least one working chamber comprising a combustion chamber and a variable volume limited inside a cylinder by a piston and by a cylinder head;

exhaust timing means and inlet timing means for allowing said working chamber to cyclically communicate respectively with a first cavity for gathering combustion gases formed in the working chamber, and successively or simultaneously with a second cavity supplied with fresh air; and means for introducing pressurised fuel into said combustion chamber; the method comprising the steps of:

actuating said exhaust and inlet timing means to retain a significant part of combustion gases from a previous cycle in the working chamber while evacuating the combustion gases and replacing a portion thereof with fresh air by opening the exhaust and inlet timing means;

initiating communication between the second cavity and the working chamber, when the inlet timing means is in an open position, an arrangement of the inlet timing means and walls of the working chamber causing the flow of fresh air from the second cavity to penetrate into the combustion chamber, while the volume of the working chamber becomes minimal due to relative movement of the piston, and to create an intense rotational movement of working fluid inside the combustion chamber, centrifugation of the fresh air obtained by this rotational movement and difference in density between the fresh air and the combustion gases preventing the fresh air from mixing, inside the combustion chamber, with the combustion gases retained in the combustion chamber, and to form, in said combustion chamber, a central zone where concentration of the combustion gases and temperature are maximal and a peripheral zone where concentration of the fresh air is maximal and temperature is minimal and injecting fuel directly into the central zone, at least at a beginning of each injection period.

2. The method according to claim 1 wherein the mass of the combustion gases retained in the working chamber, from one cycle to the next, comprises at least 10% of the mass of the working fluid contained in the working chamber at a point of interruption of communications between the working chamber and the first and second cavities during each cycle, while the engine is operating at least approximately at a nominal speed thereof.

3. The method according to claim 1, further comprising the step of selecting temperature of the inlet air and a proportion of gases retained in the working chamber, from one cycle to the next, taking account of the other operating parameters of the engine, so that if the retained gases and the fresh air were mixed before injecting the fuel, temperature of the mixture thus obtained at injection could be less than temperature at which self-ignition of the fuel takes place in a stable fashion without producing excessive end gases.

4. The method according to claim 1, further comprising the step of selecting the temperature of the inlet air and a proportion of gases retained in the working chamber, from one cycle to the next, taking account of the other operating parameters of the engine, so that a maximum mean temperature of the working fluid does not exceed a value beyond which production of $NO_x$ becomes excessive.

5. The method according to claim 1, wherein the engine operates on a two-stroke cycle.

6. The method according to claim 5, wherein the exhaust and inlet timing means are actuated so that a volume of fresh air introduced into the working chamber is less than a volume of the working chamber at an instant where the exhaust and inlet timing means have just returned to a closed position during a cycle.

7. The method according to claim 5, wherein the inlet timing means comprises ports communicating with the second cavity and positioned in a part of a lateral wall of the cylinder which is swept by the piston, said ports being uncovered by the piston when a volume of the working chamber is close to a maximum value, said ports being inclined with respect to a normal to said lateral wall, located near the ports, to create the rotational movement and wherein the exhaust timing means comprises at least one exhaust valve positioned in the cylinder head and arranged to leave free the central region of the cylinder head for arrangement in this region of the means for introducing the pressurised fuel.

8. The method according to claim 7, wherein the combustion chamber is defined by a space delimited by the cylinder head, the lateral wall and the piston when the piston is close to a position corresponding to the minimum value of the volume of the working chamber.

9. The method according to claim 8, wherein the combustion chamber has an axisymmetrical shape, and a minimal value of distance between the piston and the cylinder head is such that radial movements of the working fluid created by interaction between a transverse surface of the piston and the cylinder head are minimized.

10. The method according to claim 5 wherein the exhaust timing means and the inlet timing means comprise valves positioned in the cylinder head.

11. The method according to claim 10, wherein the combustion chamber comprises a recess positioned in the cylinder head a head of the inlet valve being located in said recess, said recess communicating with a volume swept by the piston via a passage having walls arranged to direct the flow of fresh air towards the piston when the exhaust and inlet valves are open simultaneously and when the piston is located in positions corresponding to values of volume of the working chamber which are close to a maximum volume.

12. The method according to claim 11, wherein the means for introducing pressurised fuel are located in the recess, the exhaust valve being located on an underside of said cylinder, said recess and said volume swept by the piston communicating via a passage having walls arranged to direct the flow of fresh air introduced into the working chamber, when the exhaust and inlet valves are open simultaneously, the piston being located close to the position corresponding to the maximum volume of the working chamber, towards the piston and tangentially to a part of the lateral wall of the cylinder furthest away from the exhaust valve.

13. The method according to claim 11, wherein the walls of the passage are oriented to direct the flow of fresh air towards the piston in an inclined direction with respect to an axis of displacement of said piston to induce a helicoid movement of said air flow in a volume lying between the piston and the cylinder head.

14. The method according to claim 12, wherein a shape of the passage is such that when the piston rises, the working fluid is injected into the combustion chamber, mainly tangentially to a peripheral wall of said passage to create a rotational movement of the working fluid in said recess about an axis of revolution thereof.

15. The method according to claim 11 wherein the means for introducing pressurised fuel open out into the combustion chamber facing an inlet valve in the central zone of the recess.

16. The method according to claim 11, wherein the recess is axisymmetric, an axis of said recess being located approximately in a plane perpendicular to an axis of the cylinder and not passing through the axis of the cylinder, the transfer passageway opening out to a wall of the cylinder close to a generatrix which is furthest away from the exhaust valve.

17. The method according to claim 11, wherein the recess is axisymmetric, an axis of said recess being perpendicular to an axis of the cylinder, the transfer passageway opening out tangentially to the wall of the cylinder, close to a generatrix of the cylinder which is furthest away from the exhaust valve, the lateral walls of the transfer passageway being substantially parallel to each other and inclined with respect to the axis of the cylinder in a plane tangential to said cylinder.

18. The method according to claim 11, wherein the recess is axisymmetric, an axis of revolution of the recess being located in a plane perpendicular to an axis of the cylinder, the transfer passageway opening out tangentially to a wall of the cylinder and wherein an axis parallel to the axis of the cylinder and passing through a center of the opening of the transfer passageway is not secant to the axis of revolution of the recess.

19. The method according to claim 1 wherein the engine operates on a four-stroke cycle.

20. The method according to claim 19 wherein the exhaust timing means is closed before a volume of the working chamber is a minimum valve and the inlet timing means opens only during a stroke of the piston corresponding to the increase in the volume of the working chamber at the moment when the main shaft of the engine has a position which, with respect to the position corresponding to the minimum value of the volume of the working chamber, is substantially symmetrical to the position corresponding to the closure of the exhaust timing means.

21. The method according to claim 19 wherein the exhaust timing means closes when a volume of the working chamber is close to a minimum value where there is a risk of producing interference between the piston and said exhaust timing means, the exhaust timing means reopens when the volume of the working chamber reaches and then exceeds the minimum value, and the exhaust timing means closes again when the inlet timing means partially opens and the piston is on a stroke for increasing the volume.

* * * * *